US011579581B2

United States Patent
Yakushi

(10) Patent No.: US 11,579,581 B2
(45) Date of Patent: Feb. 14, 2023

(54) SERVER, REMOTE MONITORING SYSTEM, AND REMOTE MONITORING METHOD

(71) Applicant: TADANO LTD., Kagawa (JP)

(72) Inventor: Ryosuke Yakushi, Kagawa (JP)

(73) Assignee: TADANO LTD., Kagawa (JP)

( * ) Notice: Subject to any disclaimer, the term of this patent is extended or adjusted under 35 U.S.C. 154(b) by 247 days.

(21) Appl. No.: 16/071,971

(22) PCT Filed: Feb. 2, 2017

(86) PCT No.: PCT/JP2017/003825
§ 371 (c)(1),
(2) Date: Jul. 23, 2018

(87) PCT Pub. No.: WO2017/135380
PCT Pub. Date: Aug. 10, 2017

(65) Prior Publication Data
US 2019/0025787 A1  Jan. 24, 2019

(30) Foreign Application Priority Data

Feb. 2, 2016 (JP) .............................. JP2016-018052
Nov. 10, 2016 (JP) .............................. JP2016-219933

(51) Int. Cl.
*G05B 19/048* (2006.01)
*B66C 13/46* (2006.01)
(Continued)

(52) U.S. Cl.
CPC ............ *G05B 19/048* (2013.01); *B66C 13/46* (2013.01); *G05B 23/0216* (2013.01);
(Continued)

(58) Field of Classification Search
CPC .............. G05B 19/048; G05B 19/0423; G05B 19/0425; G05B 19/0428; G05B 23/0216;
(Continued)

(56) References Cited

U.S. PATENT DOCUMENTS 7,683,771 B1 * 3/2010 Loeb .................... B60K 35/00
340/461
8,195,231 B2 * 6/2012 Ring .................... G07C 5/008
455/557
(Continued)

FOREIGN PATENT DOCUMENTS

JP    2007113229 A  *  5/2007
JP    2013-076444 A    4/2013
JP    2013-161192 A    8/2013

OTHER PUBLICATIONS

C. Rodriguez Sanchez, F. J. Gonzalez Fernandez, L. C. Simon Vena, J. Carpio and M. Castro, "Industrial Telemaintenance: Remote Management Experience From Subway to Industrial Electronics," Mar. 2011, in IEEE Transactions on Industrial Electronics, vol. 58, No. 3, pp. 1044-1051. (Year: 2011).*

(Continued)

*Primary Examiner* — Sarah M Monfeldt
*Assistant Examiner* — Michael J. Monaghan
(74) *Attorney, Agent, or Firm* — Paratus Law Group, PLLC

(57) ABSTRACT

Provided are a server for maintenance, a remote monitoring system, and a remote monitoring method. The server is connected, via a network, to a plurality of working machines each including a working machine display device that displays machine state information and a working machine operating device to be used for predetermined operation, and to a monitoring terminal that includes a display part and remotely monitors information on the working machines. Communication between each of the plurality of working machines and the server is one-way communication from the working machines to the server. The server includes a first storage part, a second storage part, and a display processing part. The display processing part generates a display part simulated image, and causes the display part of the moni- (Continued)

toring terminal to display a maintenance screen including the display part simulated image.

9 Claims, 14 Drawing Sheets

(51) Int. Cl.
| | |
|---|---|
| H04M 11/00 | (2006.01) |
| H04Q 9/00 | (2006.01) |
| G07C 5/00 | (2006.01) |
| G07C 5/08 | (2006.01) |
| G05B 23/02 | (2006.01) |

(52) U.S. Cl.
CPC .......... *G07C 5/008* (2013.01); *G07C 5/0841* (2013.01); *H04M 11/00* (2013.01); *H04Q 9/00* (2013.01); *G05B 2219/2667* (2013.01)

(58) Field of Classification Search
CPC ............... G05B 23/0208; G05B 23/0205; G05B 23/02; G05B 2219/2667; G05B 2219/2641; G05B 2219/2631; B66C 13/46; B66C 15/06; B66C 15/065; G07C 5/008; G07C 5/0816; G07C 5/0841; H04M 11/00; H04Q 9/00; H04Q 2011/0037; H04Q 2011/0039; H04Q 2011/0043
See application file for complete search history.

(56) References Cited

U.S. PATENT DOCUMENTS

| | | | | |
|---|---|---|---|---|
| 9,213,331 | B2* | 12/2015 | Johnson | G07C 5/008 |
| 2004/0148083 | A1* | 7/2004 | Arakawa | G07C 5/085 |
| | | | | 701/50 |
| 2008/0128563 | A1 | 6/2008 | Kumar et al. | |
| 2008/0180523 | A1* | 7/2008 | Stratton | G09B 9/048 |
| | | | | 348/114 |
| 2010/0249957 | A1* | 9/2010 | Price | G08C 17/02 |
| | | | | 700/83 |
| 2011/0130905 | A1* | 6/2011 | Mayer | G07C 5/008 |
| | | | | 701/22 |
| 2013/0325288 | A1* | 12/2013 | Komine | G07C 5/008 |
| | | | | 701/101 |
| 2014/0089035 | A1* | 3/2014 | Jericho | G06Q 10/06316 |
| | | | | 705/7.26 |
| 2014/0156136 | A1* | 6/2014 | Ying | H04L 63/083 |
| | | | | 701/31.4 |
| 2014/0258908 | A1* | 9/2014 | Miyoshi | G06F 3/0484 |
| | | | | 715/771 |
| 2015/0039176 | A1* | 2/2015 | Fish | G07C 5/008 |
| | | | | 701/31.6 |
| 2017/0169634 | A1* | 6/2017 | Mattern | G06Q 10/20 |
| 2017/0301151 | A1* | 10/2017 | Murata | G08B 25/00 |
| 2017/0372534 | A1* | 12/2017 | Steketee | G06Q 10/20 |
| 2018/0266081 | A1* | 9/2018 | Koshi | H04W 4/40 |

OTHER PUBLICATIONS

D. Wang and X. -I. Su, "The boiler design of remote monitoring system based on the SCADA," 2013, 2013 Chinese Automation Congress, pp. 864-869. (Year: 2013).*
Jul. 25, 2019, European Search Report issued for related EP Application No. 17747531.6.
Apr. 25, 2017, International Search Report issued for related PCT application No. PCT/JP2017/003825.
Apr. 25, 2017, International Search Opinion issued for related PCT application No. PCT/JP2017/003825.
May 4, 2021, European Communication issued for related EP application No. 17747531.6.
Joel Delhom, Flight Data Analysis (FDA), a Predictive Tool for Safety Management System (SMS), Safety first, Jan. 2014, pp. 1-5, No. 17, Airbus.
Jennifer K. O'Neill, Backdriving a Full Motion Simulator Using Flight Recorder Data, Institute for Aerospace Studies Flight Simulation Group University of Toronto, 2000, pp. i-86.

* cited by examiner

REMOTE MONITORING SYSTEM
A

FIG. 5

WORKING MACHINE MASTER TABLE M

| WORKING MACHINE ID | FIRST DISPLAY MODE CODE | SECOND DISPLAY MODE CODE | FIRST OPERATING DEVICE CODE | SECOND OPERATING DEVICE CODE |
|---|---|---|---|---|
| ..... | ..... | ..... | ..... | ..... |

MACHINE STATE INFORMATION TRANSACTION TABLE T

| WORKING MACHINE ID | DATE AND TIME | BOOM LENGTH | BOOM HOISTING ANGLE | |
|---|---|---|---|---|
| ..... | ..... | ..... | ..... | ..... |

SERVER, REMOTE MONITORING SYSTEM, AND REMOTE MONITORING METHOD

CROSS REFERENCE TO PRIOR APPLICATION

This application is a National Stage Patent Application of PCT International Patent Application No. PCT/JP2017/003825 (filed on Feb. 2, 2017) under 35 U.S.C. § 371, which claims priority to Japanese Patent Application Nos. 2016-018052 (filed on Feb. 2, 2016) and 2016-219933 (filed on Nov. 10, 2016), which are all hereby incorporated by reference in their entirety.

TECHNICAL FIELD

The present invention relates to a server, a remote monitoring system, and a remote monitoring method for monitoring information on a working machine with a terminal located at a remote place.

BACKGROUND ART

There is known a remote monitoring system for displaying information about a working machine on a terminal located at a remote place (for example, Patent Literature 1). When some problem occurs in a working machine, a remote monitoring system of this type is used for solving the problem while an operator of the working machine and a service staff member on a terminal side communicate by telephone or e-mail, and share information on the working machine.

However, in the conventional remote monitoring system, a display format of a display device mounted on the working machine differs from that of the terminal side. For example, information is graphically displayed on the display device of the working machine, while information is displayed in the terminal in tabular form. Therefore, it is difficult for the operator of the working machine to communicate with the service staff member on the terminal side, and thus it takes time to solve the problem.

CITATION LIST

Patent Literature

Patent Literature 1: JP 2013-161192 A

SUMMARY OF THE INVENTION

Problems to be Solved by the Invention

An object of the present invention is to provide a server, a remote monitoring system, and a remote monitoring method capable of facilitating communication between an operator of a working machine and a service staff member on a terminal side.

Solutions to Problems

A server according to the present invention is a server configured to be used for maintenance, the server being connected, via a network, to a plurality of working machines each including a working machine display device that displays machine state information and a working machine operating device to be used for predetermined operation, and to a monitoring terminal that includes a display part and remotely monitors information on the working machines, wherein communication between each of the plurality of working machines and the server is one-way communication from the working machines to the server,
the server including:
a first storage part that previously stores display part data that simulate a display mode of the working machine display device for each of the working machines;
a second storage part that sequentially stores machine state data representing the machine state information acquired from the working machines; and
a display processing part that, in response to a request from the monitoring terminal, generates a display part simulated image, which simulates the display mode of the working machine display device, based on the display part data corresponding to a specific one of the working machines and the machine state data acquired from the specific working machine, and causes the display part to display a maintenance screen including the display part simulated image.

A remote monitoring system according to the present invention is a remote monitoring system connected, via a network, to a plurality of working machines each including a working machine display device that displays machine state information and a working machine operating device to be used for predetermined operation, the remote monitoring system including:
a communication part that acquires information from each of the plurality of working machines through one-way communication;
a first storage part that previously stores display part data that simulate a display mode of the working machine display device for each of the working machines;
a second storage part that sequentially stores machine state data representing the machine state information acquired from the working machines;
a display processing part that generates a display part simulated image, which simulates the display mode of the working machine display device, based on the display part data corresponding to a specific one of the working machines and the machine state data acquired from the specific working machine; and
a display part that displays a maintenance screen including the display part simulated image.

A remote monitoring method a remote monitoring system connected, via a network, to a plurality of working machines each including a working machine display device that displays machine state information and a working machine operating device to be used for predetermined operation, the remote monitoring system including display part data that simulate a display mode of the working machine display device for each of the working machines, the remote monitoring method including:
a step of acquiring information from each of the plurality of working machines through one-way communication;
a step of acquiring machine state data representing the machine state information from each of the working machines, and sequentially storing the data;
a step of receiving an instruction specifying one of the working machines to be monitored;
a step of generating a display part simulated image that simulates the display mode of the working machine display device, based on the display part data corresponding to the specified working machine to be monitored and the machine state data representing the machine state information acquired from the working machine to be monitored; and a step of displaying a maintenance screen including the display part simulated image.

Effects of the Invention

According to the present invention, since the display part simulated image that simulates the display mode of the working machine display device is displayed on the display part, an operator of the working machine and a service staff member on the terminal side can obtain common recognition, and thus communication therebetween is facilitated.

BRIEF DESCRIPTION OF DRAWINGS

FIG. 5 is an explanatory diagram of a database configuration.

DESCRIPTION OF EMBODIMENTS

Next, embodiments of the present invention will be described with reference to the drawings.

Entire Configuration

First, an entire configuration of a remote monitoring system A according to one embodiment of the present invention will be described.

Figure 1:
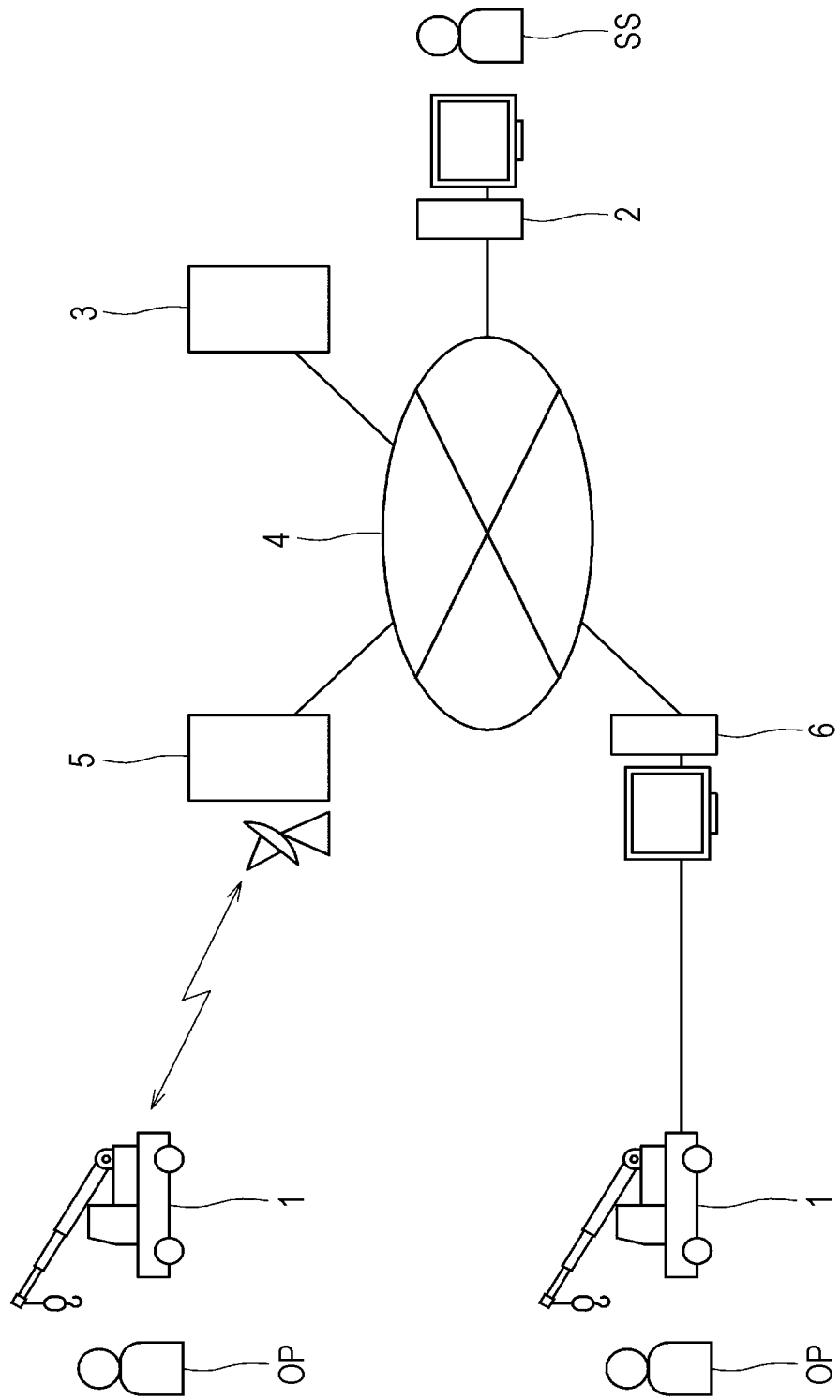
FIG. 1 is an entire configuration diagram of a remote monitoring system according to one embodiment of the present invention.

As illustrated in FIG. 1, the remote monitoring system A is a system for monitoring a working machine 1 with a monitoring terminal 2 located at a remote place. The working machine 1 is operated by an operator OP. The monitoring terminal 2 is operated by a service staff member SS. Generally, a plurality of the working machines 1 is involved. However, it is also possible to involve merely the one working machine 1. The operator OP is arranged for each working machine 1. The number of the monitoring terminals 2 may be either one or plural.

The remote monitoring system A includes a server 3. The server 3 and the monitoring terminal 2 are connected via a network 4 such as the Internet, and can communicate with each other. A base station 5 for wireless communication and a data acquisition terminal 6 are connected to the network 4. The working machine 1 can wirelessly communicate with the base station 5. Furthermore, information held by the working machine 1 can be transmitted, directly or via a storage medium, from the working machine 1 to the data acquisition terminal 6.

Working Machine 1

Next, the working machine 1 will be described.

Examples of the working machine 1 include a crane, a high lift work vehicle, a road railer, and a hydraulic excavator. Cranes include a mobile crane and a fixed crane. Hereinafter, a case of a mobile crane will be described as an example.

Figure 2:
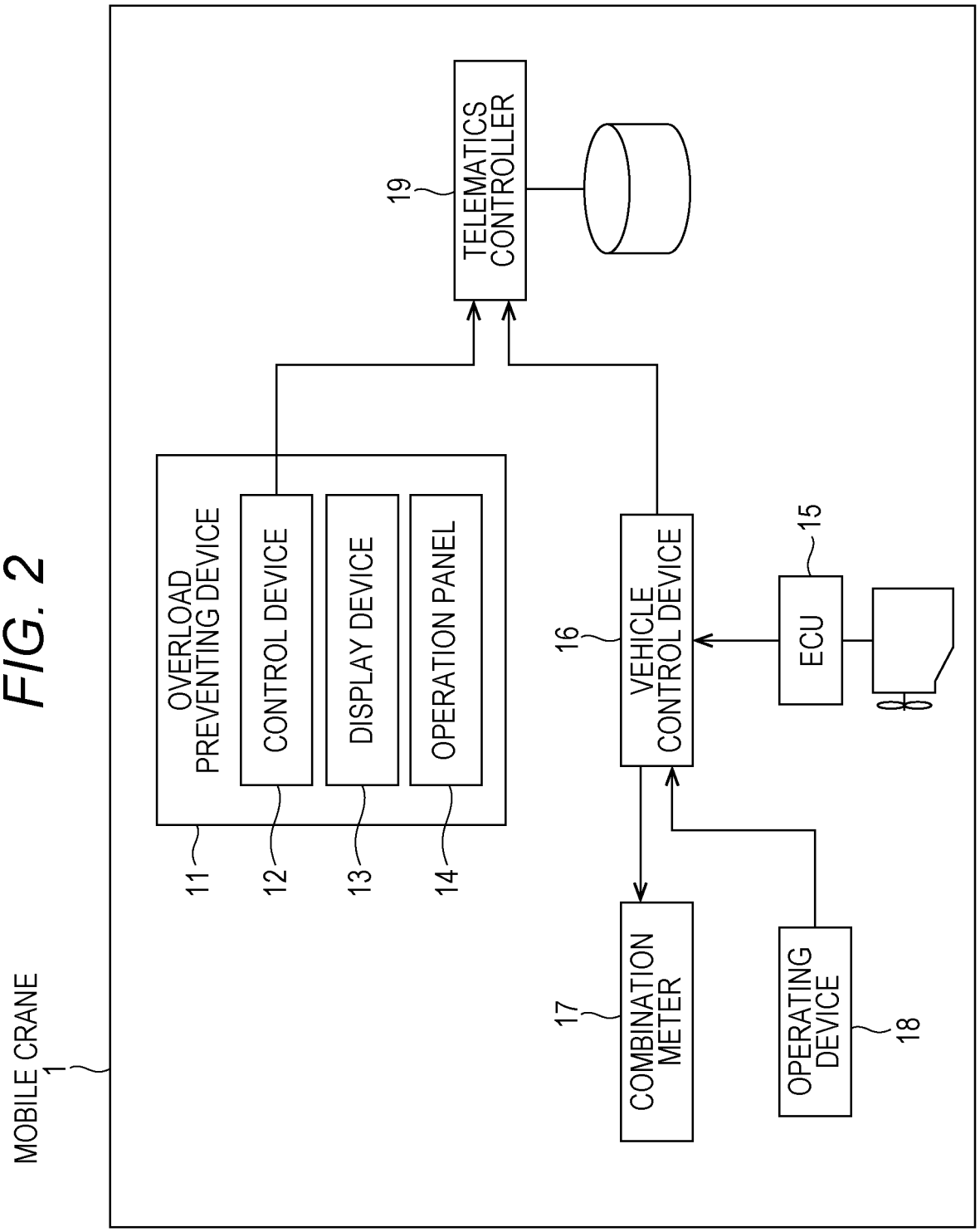
FIG. 2 is a block diagram of a mobile crane.

As illustrated in FIG. 2, a mobile crane 1 includes an overload preventing device 11, an engine control unit 15, a vehicle control device 16, a combination meter 17, an operating device 18, and a telematics controller 19.

The overload preventing device 11 has a function of preventing an overload in consideration of stability against an overturn of the mobile crane 1 and strength of constituent members. The overload preventing device 11 includes a control device 12 for achieving the function. The control device 12 is a computer including a CPU, a memory, and the like. The control device 12 holds information related to the overload preventing device 11 (hereinafter referred to as "overload preventing information"). Examples of the overload preventing information include boom length, a boom hoisting angle, a working radius, a total rated load, an actual load, outrigger overhang width, and abnormal occurrence information (overload and sensor failure).

The overload preventing device 11 includes a display device 13 and an operation panel 14. The display device 13 and the operation panel 14 are provided in a cab of the mobile crane 1. The display device 13 includes a liquid crystal display and the like, and displays the overload preventing information. The operator OP refers to the display device 13 mainly during crane operation. The operation panel 14 includes a plurality of switches and the like. The operator OP can, for example, change settings of the overload preventing device 11 by operating the operation panel 14.

The mobile crane 1 is equipped with an engine for driving a vehicle and hydraulic equipment. The engine is controlled by the engine control unit 15. Information held by the engine control unit 15 is input to the vehicle control device 16.

The vehicle control device 16 has a function of performing various controls of the mobile crane 1. The vehicle control device 16 is a computer including a CPU, a memory, and the like. The vehicle control device 16 holds information related to vehicle travel (hereinafter referred to as "vehicle travel information"). Examples of the vehicle travel information include vehicle speed, engine speed, traveling distance, the amount of fuel, and the temperature of engine cooling water.

The combination meter 17 is provided in the cab of the mobile crane 1. The combination meter 17 displays the vehicle travel information acquired from the vehicle control device 16. The operator OP refers to the combination meter 17 mainly during vehicle travel.

The operating device 18 is connected to the vehicle control device 16. The operating device 18 includes various switches, levers, and the like provided in the cab of the mobile crane 1. The operator OP can, for example, switch functions and change settings of the mobile crane 1 by operating the operating device 18.

The telematics controller 19 has functions of collecting and storing various information of the mobile crane 1, and wirelessly transmitting the stored information to the base station 5. The telematics controller 19 is a computer including a CPU, a memory, and the like.

The telematics controller 19 of the present embodiment collects and stores the overload preventing information from the control device 12 of the overload preventing device 11. Furthermore, the telematics controller 19 also collects and stores the vehicle travel information from the vehicle control device 16. Hereinafter, the overload preventing information and the vehicle travel information are collectively referred to as "machine state information." The machine state information includes all information representing a state of the working machine, or may include a part thereof. The machine state information is not limited to the overload preventing information and the vehicle travel information, and other information may be added thereto.

For example, the telematics controller 19 wirelessly transmits the stored machine state information, as necessary. The machine state information transmitted from the telematics controller 19 is then transmitted to the server 3 via the base station 5 and the network 4.

Moreover, for example, the telematics controller 19 transmits the stored machine state information to the data acquisition terminal 6. The configuration thereof is not particularly limited. For example, the telematics controller 19 and the data acquisition terminal 6 are directly connected via a USB cable or the like so as to transmit the machine state information from the telematics controller 19 to the data acquisition terminal 6. The telematics controller 19 may write the machine state information to a storage medium to be read by the data acquisition terminal 6.

The data acquisition terminal 6 is a general-purpose computer. The machine state information acquired by the data acquisition terminal 6 is transmitted to the server 3 via the network 4.

The display device 13 of the overload preventing device 11 and the combination meter 17 correspond to a "first display device" and a "second display device" recited in the claims, respectively. In addition, a "working machine display device" recited in the claims includes the display device 13 of the overload preventing device 11, as the first display device, and the combination meter 17 as the second display device. The working machine display device is a device for displaying the machine state information. The configuration of the working machine display device is not particularly limited. The working machine display device may be a general-purpose display device such as a liquid crystal display or a dedicated display such as the combination meter 17.

The operation panel 14 of the overload preventing device 11 and the operating device 18 each correspond to a "working machine operating device" recited in the claims. The working machine operating device is a device for performing various operations of the working machine. The working machine operating device includes a switch, a lever, and the like, while the configuration thereof is not particularly limited.

The display mode of the display device 13 of the overload preventing device 11 may be different depending on the working machine 1. For example, the overload preventing information is displayed in different unit systems between the working machine 1 for domestic specifications and the working machine 1 for overseas specifications. In addition, items to be displayed may also be different depending on the model of the working machine 1. Similarly, the display mode of the combination meter 17 may also be different depending on the working machine 1.

It should be noted that in the present specification, the "display mode" means a mode of an information display format, which includes not only types of display formats such as graphic display and table format display, but also letters, numerals, an arrangement of graphics, display items, and others.

The specification of the operation panel 14 of the overload preventing device 11 may be different depending on the working machine 1. For example, an arrangement of switches may be different depending on the model of the working machine 1. Similarly, the specification of the operating device 18 may also be different depending on the working machine 1.

Monitoring Terminal 2

Next, the hardware configuration of the monitoring terminal 2 will be described.

Figure 3:
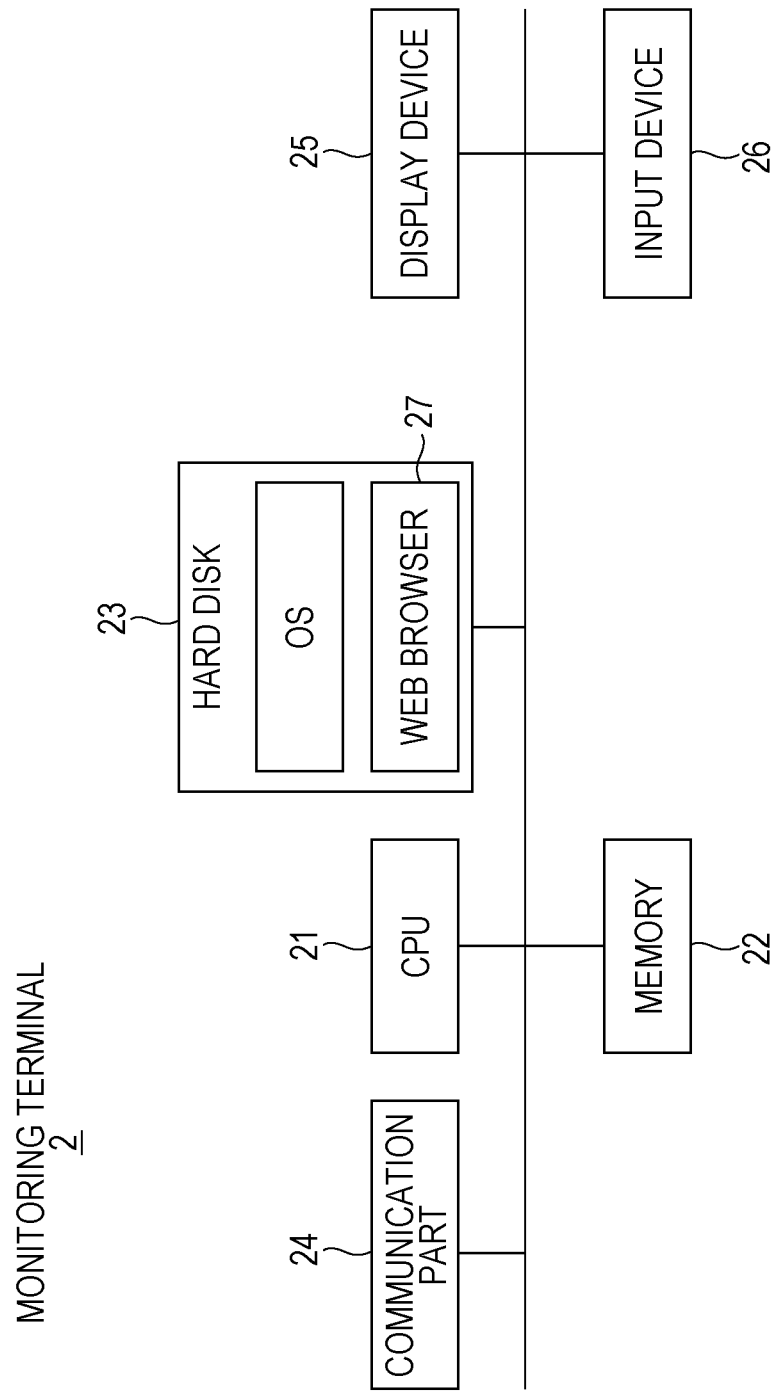
FIG. 3 is a hardware configuration diagram of a monitoring terminal.

As illustrated in FIG. 3, the monitoring terminal 2 is a general-purpose computer. The monitoring terminal 2 mainly includes a CPU 21, a memory 22, a hard disk 23, a communication part 24, a display device 25, and an input device 26. The communication part 24 has a function of connecting to the network 4 and communicating. The display device 25 is a liquid crystal display or the like. The input device 26 is a keyboard, a mouse, or the like.

In addition to an operating system (OS), a web browser program 27 is installed on the hard disk 23. Therefore, the monitoring terminal 2 can run a web browser.

Server 3

Next, the hardware configuration of the server will be described.

Figure 4:
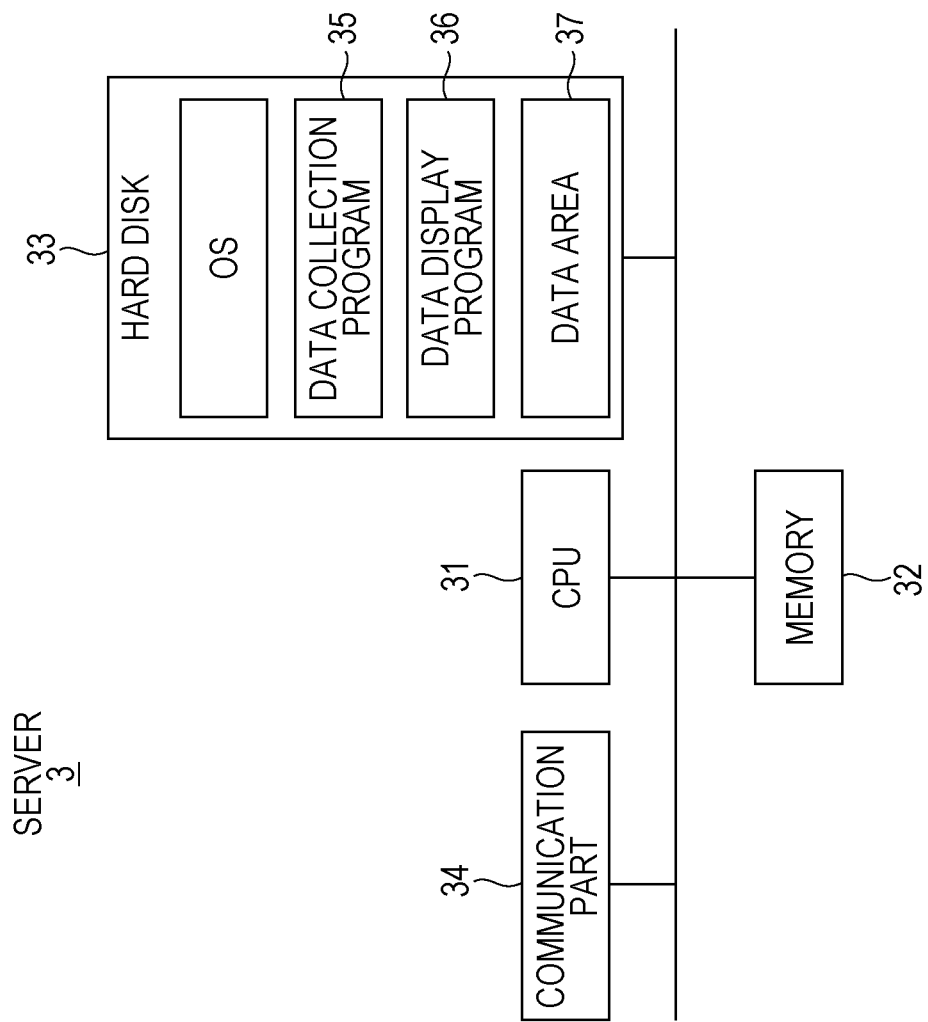
FIG. 4 is a hardware configuration diagram of a server.

As illustrated in FIG. 4, the server 3 mainly includes a CPU 31, a memory 32, a hard disk 33, and a communication part 34. The communication part 34 has a function of connecting to the network 4 and communicating.

In addition to an operating system (OS), a data collection program 35 and a data display program 36 are installed on the hard disk 33. Furthermore, in order to achieve a function as a database, a data area 37 for storing data is secured in the hard disk 33.

Next, a database configuration will be described.

As illustrated in FIG. 5, a working machine master table M and a machine state information transaction table T are stored in the data area 37.

The working machine master table M includes a working machine ID, a first display mode code, a second display mode code, a first operating device code, and a second operating device code, as data fields. The working machine ID is an ID for identifying the individual working machines 1. As the working machine ID, a unique value is previously assigned to each working machine 1.

The first display mode code is a code for identifying the display mode of the display device 13 of the overload preventing device 11. As described above, the display mode of the display device 13 may be different depending on the working machine 1. As the first display mode code, for example, different values are assigned to the display mode for domestic specifications and that for overseas specifications. It should be noted that the first display mode code may be replaced with a code for identifying the specification of the overload preventing device 11.

The second display mode code is a code for identifying the display mode of the combination meter 17. As described above, the display mode of the combination meter 17 may be different depending on the working machine 1. As the second display mode code, for example, different values are assigned to the display mode for domestic specifications and that for overseas specifications. It should be noted that the second display mode code may be replaced with a code for identifying the specification of the combination meter 17.

The first display mode code and the second display mode code each correspond to a "display mode code" recited in the claims. The display mode code may be any code as long as it identifies the display mode of the working machine display device.

The first display mode code is associated with display part data that simulate the display mode of the display device 13 (working machine display device) of the overload preventing device 11. In addition, the second display mode code is associated with the display part data that simulate the display mode of the combination meter 17 (working machine display device). That is, the working machine master table M corresponds to a "first storage part" that previously stores the display part data that simulate the display mode of the working machine display device for each working machine 1.

The first operating device code is a code for identifying the type of the operation panel 14 of the overload preventing device 11. As described above, the specification of the operation panel 14 may be different depending on the working machine 1. As the first operating device code, a unique value is assigned for each type of the operation panel 14. Incidentally, the first operating device code may be replaced with a code for identifying the specification of the overload preventing device 11.

The second operating device code is a code for identifying the type of the operating device 18. As described above, the specification of the operating device 18 may be different depending on the working machine 1. As the second operating device code, a unique value is assigned for each type of the operating device 18.

The first operating device code and the second operating device code correspond to the "operating device code" recited in the claims. The operating device code may be any code as long as it identifies the type of the working machine operating device.

The first operating device code is associated with operating part data that simulate the arrangement mode of switches and the like on the operation panel 14 (working machine operating device) of the overload preventing device 11. In addition, the second operating device code is associated with the operating part data that simulate the arrangement mode of switches and the like on the operating device 18 (working machine operating device). That is, the working machine master table M corresponds to a "third storage part" that stores the operating part data that simulate the arrangement mode of switches and the like on the working machine operating device for each working machine 1.

The working machine master table M includes the working machine ID, the first display mode code, the second display mode code, the first operating device code, and the second operating device code of the working machine 1, which are registered in advance for each working machine 1 to be monitored.

The machine state information transaction table T includes the working machine ID, a date and time, and various items of the machine state information, as data fields. Items of the machine state information include items of the overload preventing information and items of the vehicle travel information. Examples of the items of the overload preventing information include boom length, a boom hoisting angle, a working radius, a total rated load, an actual load, and outrigger overhang width. Examples of the items of the vehicle travel information include vehicle speed, engine speed, traveling distance, the amount of fuel, and the temperature of engine cooling water.

Machine state data representing the machine state information for each working machine 1 are registered in the machine state information transaction table T through data collection processing to be described below. That is, the machine state information transaction table T corresponds to a "second storage part" that sequentially stores the machine state data representing the machine state information acquired from the working machines 1.

As described above, the server 3 stores the machine state information, the display mode code, and the operating device code of the working machine 1 in association with the working machine ID of the working machine 1.

Data Acquisition Processing

Next, data acquisition processing will be described.

As a part of the data acquisition processing, the CPU 31 of the server 3 performs processing to be performed in the server 3, by executing the data collection program 35.

The machine state information is stored in the telematics controller 19 of the working machine 1. The telematics controller 19 wirelessly transmits the working machine ID of the working machine 1, the date and time at which the machine state information is collected, and the machine state information. Here, the timing of collecting the machine state information and the timing of wirelessly transmitting the machine state information are not particularly limited. The machine state information may be collected and wirelessly transmitted at a timing when some problem occurs in the working machine 1, or may be collected and wirelessly transmitted on a periodic basis. Various data (including the machine state data) transmitted from the telematics controller 19 is then transmitted to the server 3 via the base station 5 and the network 4.

Furthermore, the telematics controller 19 may transmit the stored machine state information to the data acquisition terminal 6. In this case, the machine state information is transmitted from the data acquisition terminal 6 to the server 3 via the network 4.

When the server 3 receives data including the working machine ID, the date and time, and the machine state information from the working machine 1, the server 3 adds the data to the machine state information transaction table T.

With the repetition of the above-described processing, the machine state information of the working machines 1 of various types for various dates and times is registered in the machine state information transaction table T.

Data Display Processing

Next, data display processing will be described with reference to FIG. 6.

As a part of the data display processing, the CPU 31 of the server 3 performs processing to be performed in the server 3, by executing the data display program 36. That is, the CPU 31 functions as a display processing part for causing the display device 25 (display part) of the monitoring terminal 2 to display an image.

First, the service staff member SS connects to a remote monitoring site with a web browser installed in the monitoring terminal 2 (step S11). Upon connecting with the monitoring terminal 2, the server 3 invokes the data display program 36, and transmits a remote monitoring screen to the monitoring terminal 2 in HTML format or the like (step S21).

In step S21, the server 3 refers to the machine state information transaction table T, and acquires the working machine IDs and the dates and times. Then, the server 3 generates and transmits the remote monitoring screen that includes a list including the working machine IDs and the dates and times.

Upon being transmitted from the server 3, the remote monitoring screen is displayed in the web browser of the monitoring terminal 2 (step S12). The service staff member SS can specify a particular working machine and a particular date and time from among those in the list included in the remote monitoring screen. When the service staff member SS specifies the particular working machine and the particular date and time, the information is transmitted to the server 3 (step S13).

When the particular working machine and the particular date and time are specified from the monitoring terminal 2, the server 3 refers to the machine state information transaction table T, and acquires the machine state information corresponding to the working machine ID of the specified working machine and the date and time (step S22).

Next, the server 3 generates a display part simulated image that simulates the display mode of the working machine display device and an operating part simulated image that simulates the display mode of the working machine operating device (step S23). Hereinafter, various simulated images will be described in order.

A display part simulated image of the display device 13 of the overload preventing device 11 and an operating part simulated image I2 of the operation panel 14 of the overload preventing device 11 are generated in the following procedure.

First, the server 3 refers to the working machine master table M, and acquires the first display mode code and the first operating device code corresponding to the working machine ID of the specified working machine. Next, the server 3 generates the display part simulated image I1 (first display part simulated image) in which the machine state information (overload preventing information) acquired in step S22 is displayed in a display mode indicated by the first display mode code. In addition, the server 3 generates the operating part simulated image I2 corresponding to the first operating device code.

Here, the data display program 36 includes each display mode code and a simulated image generation program corresponding to each operating device code. The simulated image generation program includes the display part data that simulate the display mode of the working machine display device for each working machine 1 and the operating part data that simulate the arrangement mode of the switches and the like on the working machine operating device for each working machine 1. The server 3 executes the simulated image generation program corresponding to the acquired display mode code or operating device code, and thus generates a corresponding simulated image.

Figure 7:
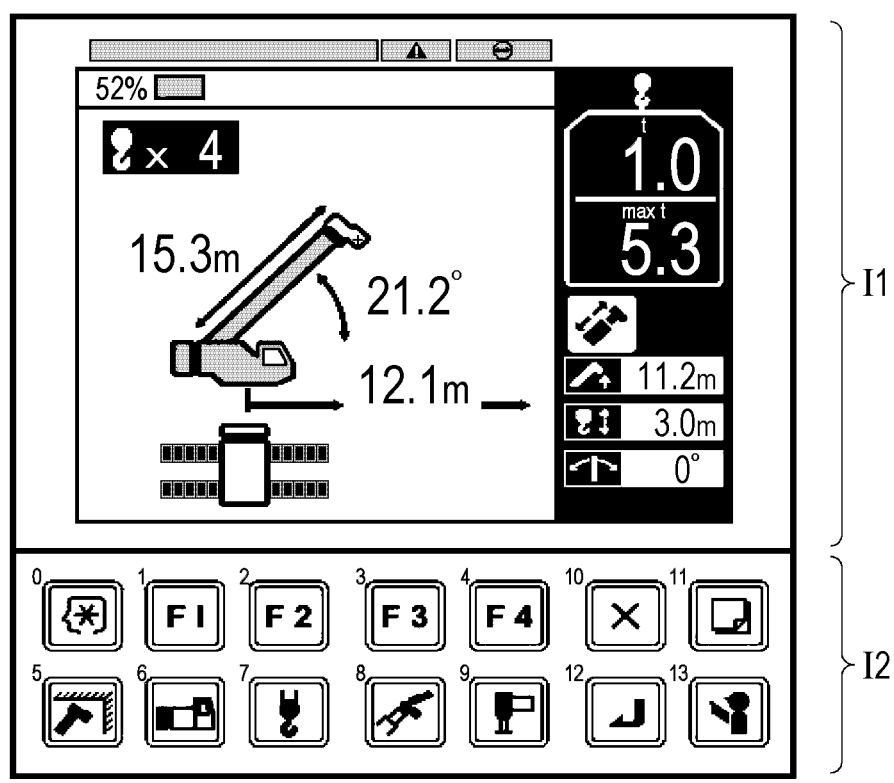
FIG. 7 is an explanatory diagram of a simulated image of a display device of an overload preventing device and a simulated image of an operation panel of the overload preventing device.

That is, the server 3 generates the display part simulated image that simulates the display mode of the display device 13 (working machine display device) of the overload preventing device 11, based on the display part data (display part data associated with the first display mode code) corresponding to the specified working machine 1 and the machine state data acquired from the working machine 1 (see FIG. 7). Specifically, the server 3 combines graphic data representing the working machine 1, included in the display part data, with the machine state data to generate the display part simulated image. The image data representing a crane as illustrated in FIG. 7 are graphic data.

Furthermore, the server 3 generates the operating part simulated image that simulates the arrangement mode of the working machine operating device, based on the operating part data (operating part data associated with the first operating device code) corresponding to the specified working machine 1 (see FIG. 7).

The display part simulated image I1 and the operating part simulated image I2 generated by the above-described processing are images as illustrated in FIG. 7. The display part simulated image I1 is an image that simulates the display device 13 of the overload preventing device 11. The display mode of the machine state information is also simulated in the display part simulated image I1. The operating part simulated image I2 is an image that simulates the operation panel 14 of the overload preventing device 11.

Figure 8:
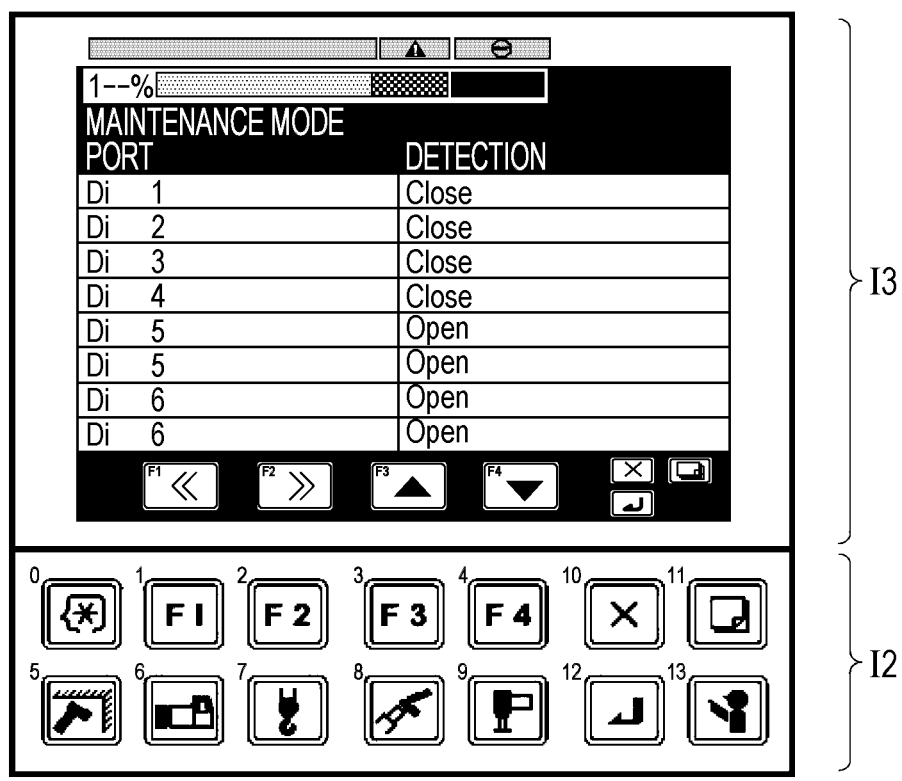
FIG. 8 is an explanatory diagram of a simulated image of a display device of an overload preventing device and a simulated image of an operation panel of the overload preventing device in another embodiment.

While the display part simulated image I1 reproduces a normal screen of the overload preventing device 11, the server 3 may generate a simulated image I3 that reproduces another screen. The simulated image I3 illustrated in FIG. 8 is an image that reproduces a maintenance screen of the overload preventing device 11 (hereinafter referred to as a "maintenance simulated image"). In this case, the machine state information includes maintenance information to be used for maintenance of the working machine 1. Data representing the maintenance information are stored in the machine state information transaction table T.

A display part simulated image I4 of the combination meter 17 is generated in the following procedure.

Figure 9:
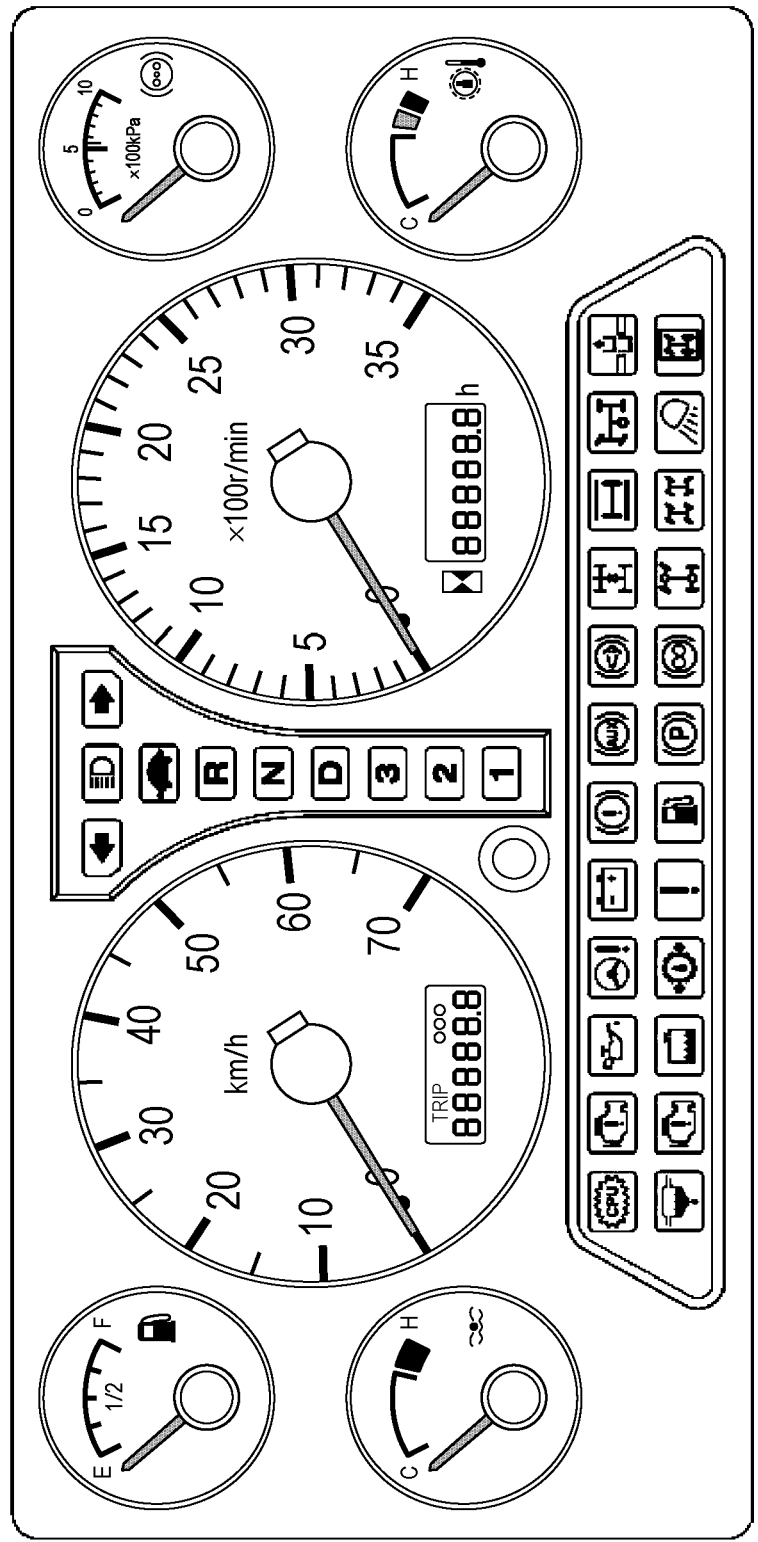
FIG. 9 is an explanatory diagram of a simulated image of a combination meter.

First, the server 3 refers to the working machine master table M, and acquires the second display mode code corresponding to the working machine ID of the specified working machine. Next, the server 3 generates the display part simulated image I4 (second display part simulated image) in which the machine state information (vehicle travel information) acquired in step S22 is displayed in the display mode indicated by the second display mode code. The display part simulated image I4 generated by the above-described processing is an image as illustrated in FIG. 9.

A simulated image I5 of the operating device 18 is generated in the following procedure.

Figure 10:
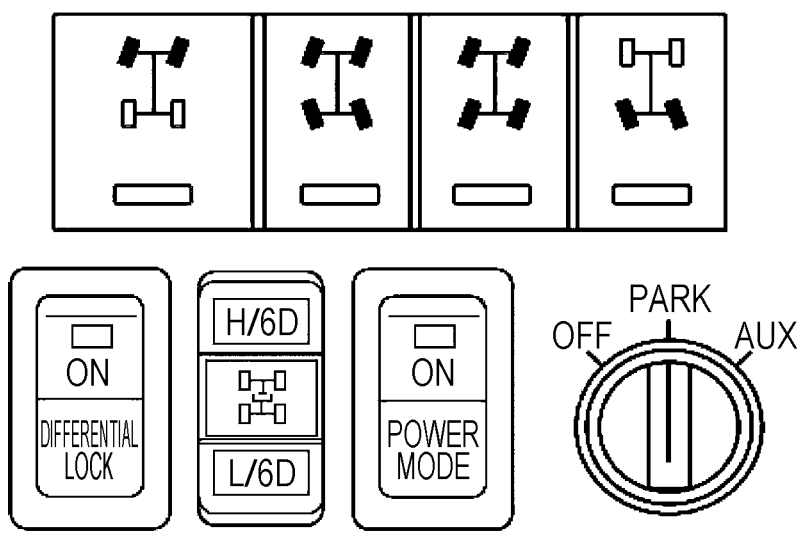
FIG. 10 is an explanatory diagram of a simulated image of an operating device.

First, the server 3 refers to the working machine master table M, and acquires the second operating device code corresponding to the working machine ID of the specified working machine. Next, the server 3 generates the operating part simulated image I5 corresponding to the second operating device code. The operating part simulated image I5 generated by the above-described processing is an image as illustrated in FIG. 10. FIG. 10 illustrates an example of the switches provided in the cab of the working machine 1.

Returning to FIG. 6, description will be continued. The server 3 transmits the generated simulated images I1 to I5 to the monitoring terminal 2 (step S24). Upon being transmitted from the server 3, the simulated images I1 to I5 are displayed in the web browser of the monitoring terminal 2 (step S14). The service staff member SS can confirm the machine state information of the specified working machine and the configuration of the working machine operating device, by referring to the simulated images I1 to I5.

As described above, the machine state information is displayed in the monitoring terminal 2 in a display mode simulating the display mode of the working machine display device. Therefore, the operator OP of the working machine 1 and the service staff member SS on the terminal side are to see display in the same mode. As a result, the operator OP and service staff member SS can obtain common recognition, and thus communication therebetween is facilitated. For example, even if the operator OP and the service staff member SS have different native languages, it is easy for both parties to communicate.

Furthermore, an image that simulates the working machine operating device is displayed in the monitoring terminal 2. Therefore, the service staff member SS can easily provide the operator OP with instructions on operation by telephone or e-mail.

Even if some problem occurs in the working machine 1, the problem can be solved at an early stage since the operator OP and the service staff member SS can easily communicate. As a result, it is possible to reduce downtime of the working machine 1.

Incidentally, when the service staff member SS specifies another working machine in step S13, the server 3 may generate, in step S23, a simulated image in a mode different from that of the simulated images I1 to I5.

Figure 11:
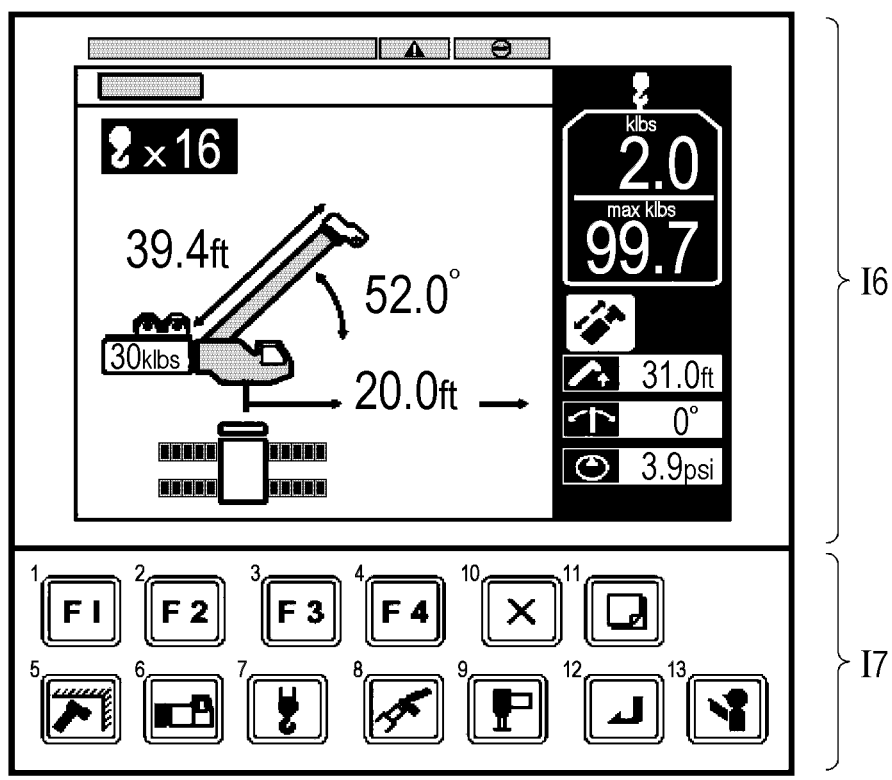
FIG. 11 is an explanatory diagram of a simulated image of a display device of an overload preventing device and a simulated image of an operation panel of the overload preventing device in still another embodiment.

For example, the server 3 generates a display part simulated image I6 and an operating part simulated image I7, as illustrated in FIG. 11. The display part simulated image I6 is an image that simulates the display device 13 of the overload preventing device 11. The display part simulated image I6 differs from the display part simulated image I1 illustrated in FIG. 7, in the unit system and a figure representing a crane (graphic data included in the display part data). The display part simulated image I1 is in a display mode for domestic specifications, and the simulated image I6 is in a display mode for overseas specifications. The operating part simulated image I7 is an image that simulates the operation panel 14 of the overload preventing device 11. The operating part simulated image I7 differs from the operating part simulated image I2 illustrated in FIG. 7 in the arrangement of switches. The operating part simulated image I2 and the operating part simulated image I7 are different images according to differences in specification of the overload preventing device 11. Specifically, the display part simulated image I1 is displayed in a unit system of the metric system, and the display part simulated image I6 is displayed in a unit system of the yard-pound system. The server 3 calculates values converted into the corresponding unit systems, and displays the values in the display part simulated images I1 and I6, based on the machine state data from the working machine 1.

Figure 12:
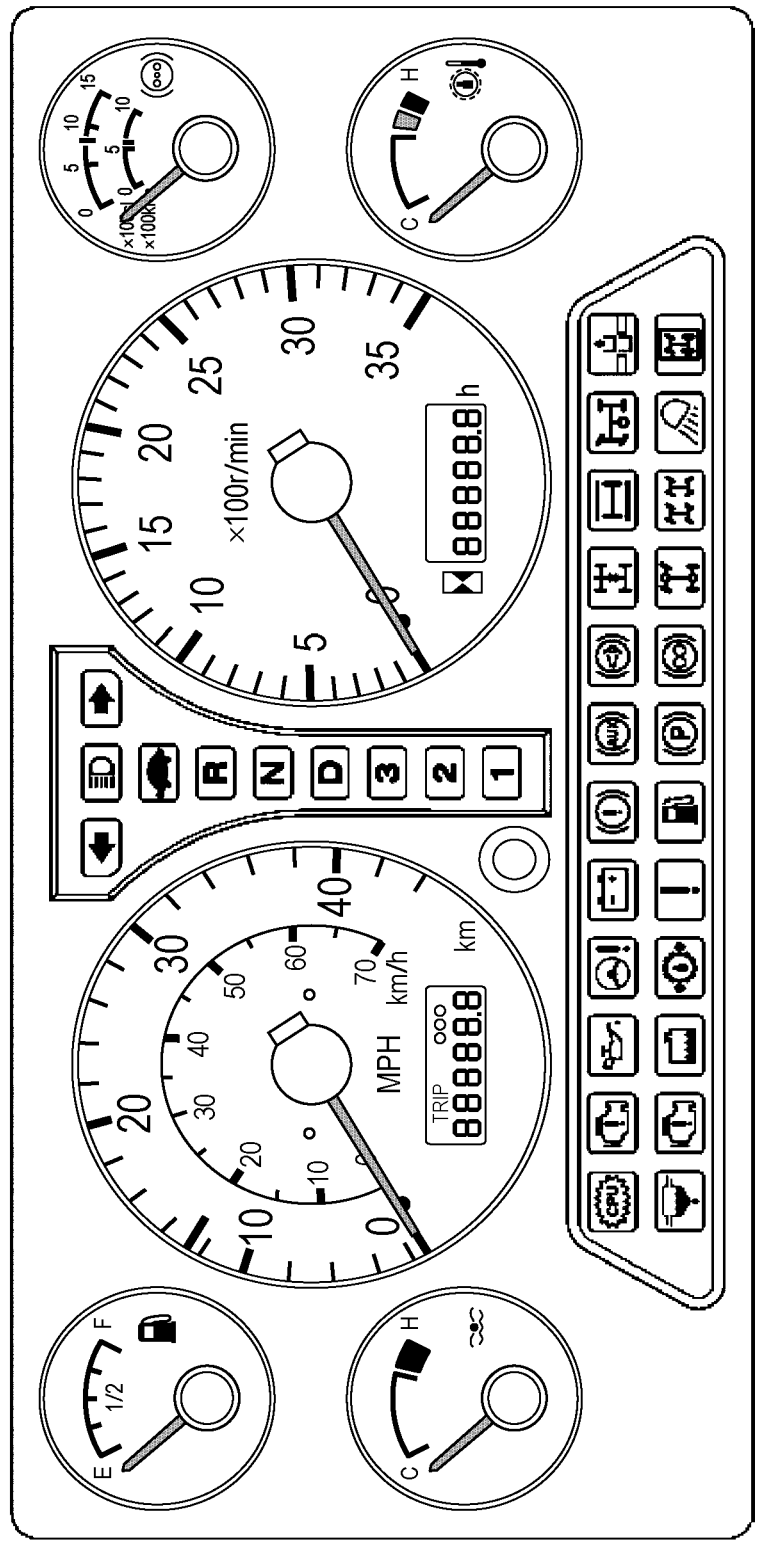
FIG. 12 is an explanatory diagram of a simulated image of a combination meter in another embodiment.

In addition, the server 3 generates a display part simulated image I8 as illustrated in FIG. 12. The display part simulated image I8 is an image that simulates the combination meter 17. The display part simulated image I8 differs from the display part simulated image I4 illustrated in FIG. 9, in unit systems. The display part simulated image I4 is in a display mode for domestic specifications, and the display part simulated image I8 is in a display mode for overseas specifications. Specifically, in the display part simulated image I4, a speedometer is displayed in a unit system of the metric system (km/h). In the display part simulated image I8, a speedometer is displayed in unit systems of the metric system and the yard-pound system (km/h and MPH). The server 3 calculates values converted into the corresponding unit systems, based on the machine state data from the working machine 1, and displays the values in the display part simulated images I4 and I8.

It should be noted that when text information is included in the machine state information, the server 3 may change a display language in the display part simulated image according to a display language in each working machine 1. In addition, the machine state information may be displayed in a unit system and a display language selectable in the web browser of the monitoring terminal 2.

As described above, the server 3 according to the embodiment is connected, via a network, to the plurality of working machines 1 and the monitoring terminal 2 that includes the display device 25 (display part). The plurality of working machines 1 each includes the display device 13 of the overload preventing device 11 for displaying the machine state information, the combination meter 17 (working machine display device), the operation panel 14 of the overload preventing device 11 to be used for predetermined operation, and the operating device 18 (working machine operating device). The server 3 includes the working machine master table M (first storage part), the machine state information transaction table T (second storage part), and the CPU 31 (display processing part). The working machine master table M previously stores the display part data that simulate the display mode of the working machine display device for each working machine 1. The machine state information transaction table T sequentially stores the machine state data representing the machine state information acquired from the working machine 1. In response to a request from the monitoring terminal 2, the CPU 31 generates the display part simulated image that simulates the display mode of the working machine display device, based on the display part data corresponding to a particular one of the working machines 1 and the machine state data acquired from the particular working machine 1, and causes the display device 25 to display the generated display part simulated image.

The remote monitoring system A according to the embodiment includes the working machine master table M (first storage part), the machine state information transaction table T (second storage part), the CPU 31 (display processing part) of the server 3, and the display device 25 (display part) of the monitoring terminal 2. The working machine master table M previously stores the display part data that simulate the display mode of the working machine display device for each working machine 1. The machine state information transaction table T sequentially stores the machine state data representing the machine state information acquired from the working machines 1. The CPU 31 generates the display part simulated image that simulates the display mode of the working machine display device, based on the display part data corresponding to the particular working machine 1 and the machine state data acquired from the particular working machine 1. The display device 25 displays the display part simulated image.

Figure 6:
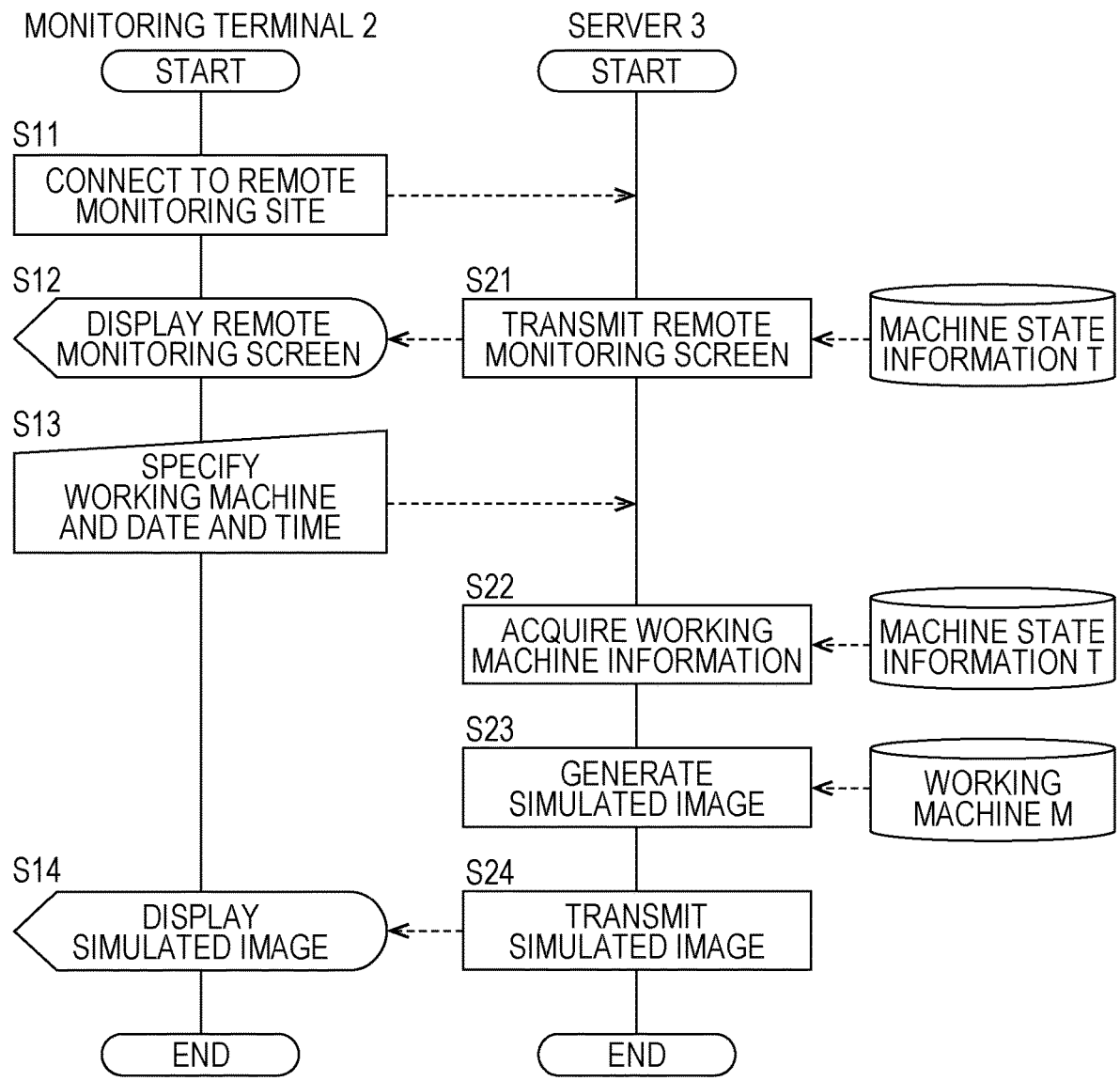
FIG. 6 is a flowchart of data display processing.

The remote monitoring method in the remote monitoring system A according to the embodiment includes steps S13, S22, S23, and S14 of FIG. 6. Step S13 includes a step of acquiring and sequentially storing the machine state data representing the machine state information from each working machine 1, and a step of receiving an instruction specifying a working machine to be monitored. Steps S22 and S23 include a step of generating the display part simulated image that simulates the display mode of the working machine display device, based on the display part data corresponding to the specified working machine 1 to be monitored and the machine state data representing the machine state information acquired from the working machine 1 to be monitored. Step S14 includes a step of displaying the display part simulated image.

As described above, the machine state information of the specified working machine 1 is displayed in the monitoring terminal 2 in the display mode indicated by the display mode code of the working machine 1. Therefore, even if the display mode of the working machine display device differs for each working machine 1, it is possible to display the machine state information of the specified working machine 1 in the monitoring terminal 2, in a display mode corresponding to the working machine. Accordingly, the operator OP and the service staff member SS can see display in the same mode.

In addition, an image corresponding to the operating device code of the specified working machine 1 is displayed in the monitoring terminal 2. Therefore, even if the working machine operating device differs for each individual working machine 1, it is possible to display an image that simulates the working machine operating device of the specified working machine in the monitoring terminal 2. Accordingly, the service staff member SS can easily provide the operator OP with instructions on operation.

Other Embodiments

In the above-described embodiment, the server 3 performs the simulated image generation processing (step S23). However, a part or all of the processing may be performed by the monitoring terminal 2. When the monitoring terminal 2 performs the simulated image generation processing, for example, the following processing is performed. The server 3 transmits the working machine information acquired in step S22 to the monitoring terminal 2. Furthermore, the server 3 transmits the display mode code and the operating device code of the specified working machine to the monitoring terminal 2. The monitoring terminal 2 executes the preinstalled simulated image generation program to generate a simulated image.

The monitoring terminal 2 may perform the function of the server 3. That is, a single computer may be equipped with the function of the server 3 and the function of the monitoring terminal 2.

In the above-described embodiment, a web browser installed in the monitoring terminal 2 is used. However, a dedicated application may be used instead of the web browser.

In the above-described embodiment, the simulated image is displayed in the monitoring terminal 2. However, the embodiment is not limited thereto. The machine state information just needs to be displayed in the monitoring terminal 2, in a display mode simulating the display mode of the working machine display device.

An object to be displayed in the monitoring terminal 2 is not limited to the display device 13 of the overload preventing device 11, the combination meter 17, the operation panel 14 of the overload preventing device 11, or the operating device 18.

A part of information held by the working machine 1 may be directly transmitted to the monitoring terminal 2 without involving the server 3, and may be displayed in the monitoring terminal 2.

Furthermore, the display part simulated image and the operating part simulated image may be simultaneously displayed or selectively displayed. Moreover, when there are plural types of display part simulated images or operating part simulated images, the images may be simultaneously displayed or selectively displayed.

Figure 13:
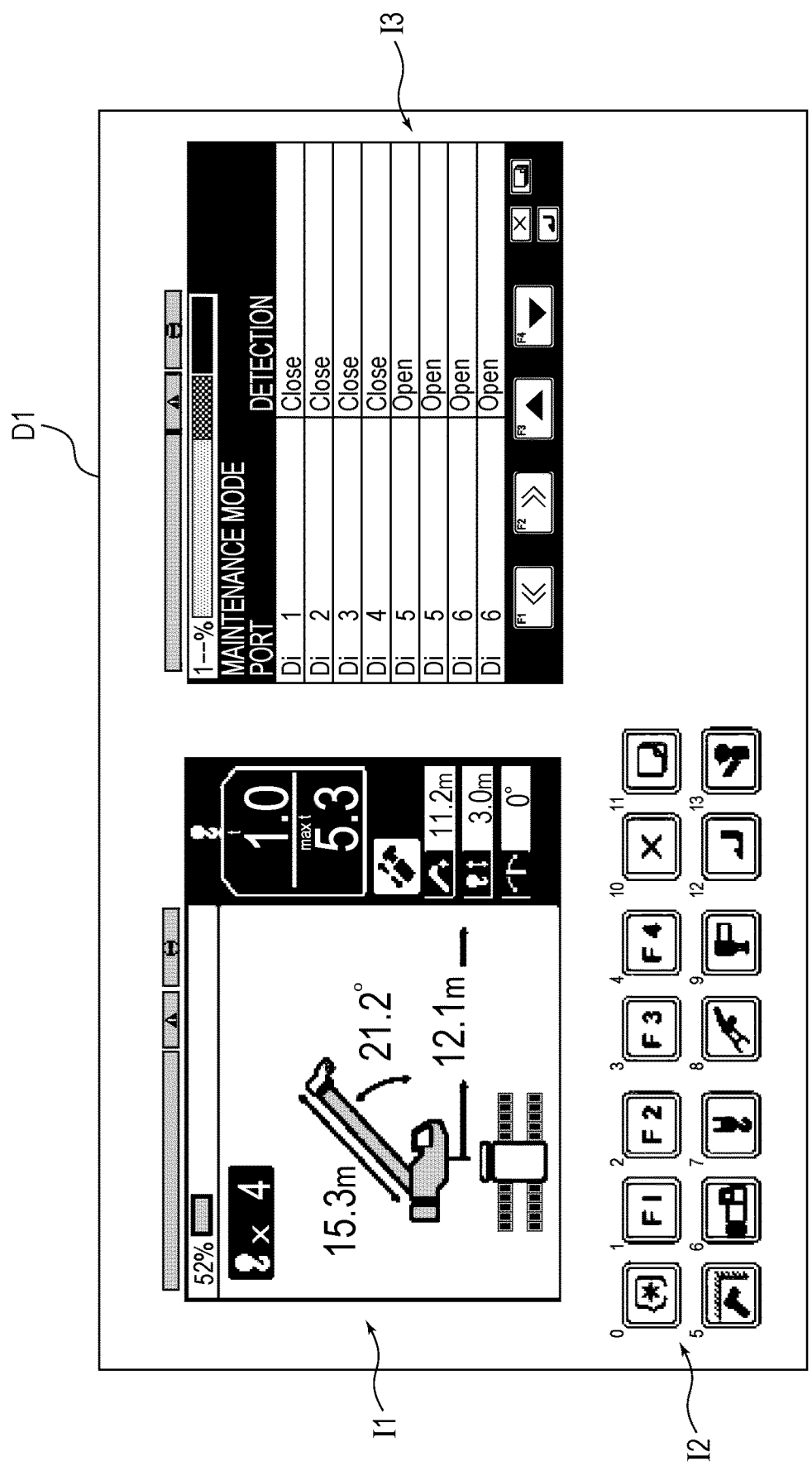
FIG. 13 illustrates an example of displaying a display part simulated image, an operating part simulated image, and a maintenance simulated image on a single screen.
Figure 14:
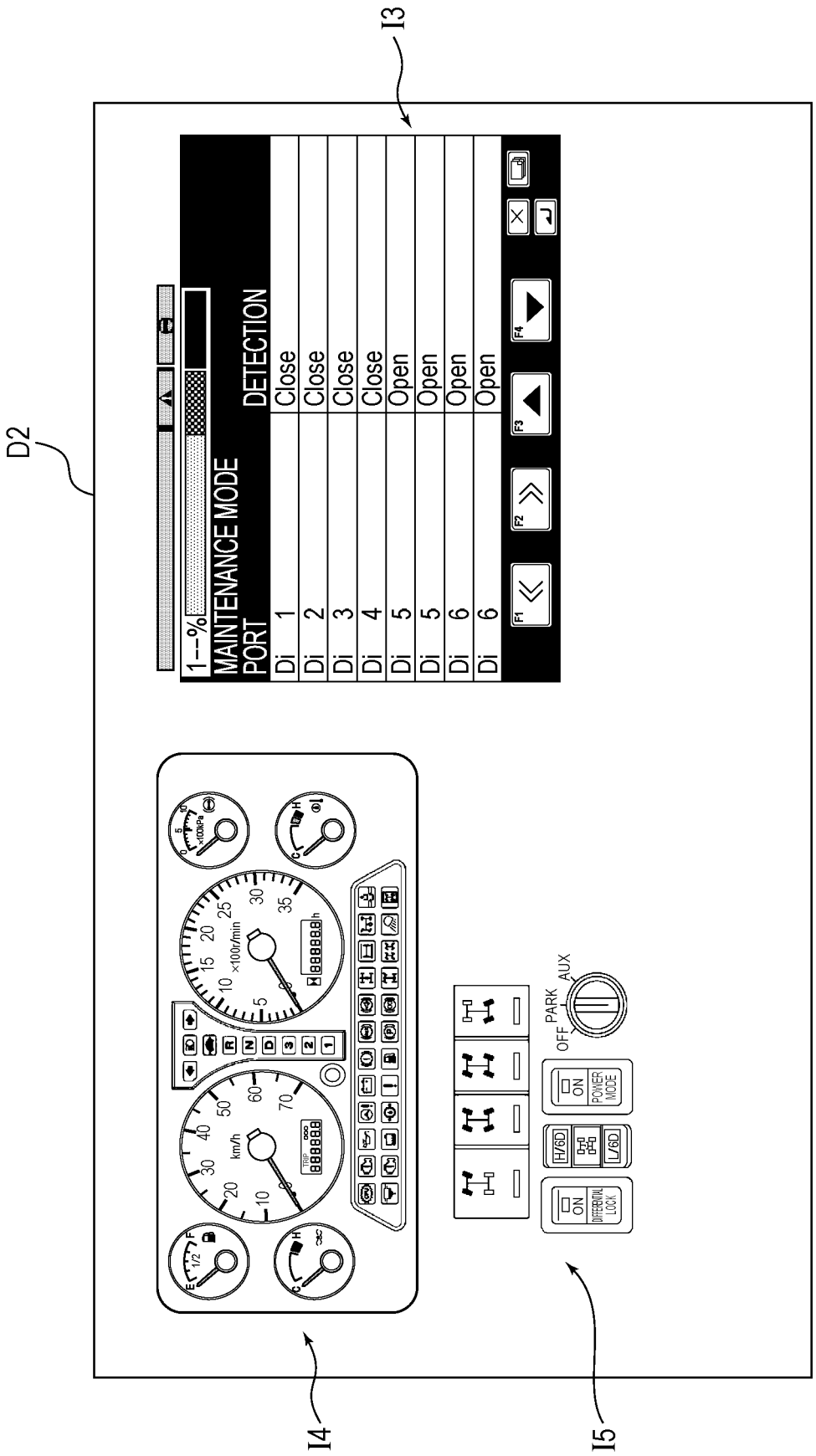
FIG. 14 illustrates another example of displaying a display part simulated image, an operating part simulated image, and a maintenance simulated image on a single screen.

FIGS. 13 and 14 illustrate display examples of simultaneously displaying the display part simulated image and the operating part simulated image. A display screen D1 illustrated in FIG. 13 includes the display part simulated image I1 that simulates the display device 13 of the overload preventing device 11, the operating part simulated image I2 that simulates the operation panel 14, and the maintenance simulated image I4 that simulates a display screen of the maintenance information, which are displayed on a single screen. A display screen D2 illustrated in FIG. 14 includes the display part simulated image I4 that simulates the combination meter 17, the operating part simulated image I5 that simulates the operating device 18, and the maintenance simulated image I4 that simulates the display screen of the maintenance information, which are displayed on a single screen. As the maintenance simulated image is displayed together with the display part simulated image and/or the operating part simulated image, the service staff member SS can easily specify a cause of abnormal occurrence, and can provide the operator OP with more accurate instructions.

REFERENCE SIGNS LIST

A remote monitoring system
1 working machine
2 monitoring terminal
3 server
4 network
5 base station
6 data acquisition terminal
11 overload preventing device
12 control device
13 display device (working machine display device and first display device)
14 operation panel (working machine operating device)
15 engine control unit
16 vehicle control device
17 combination meter (working machine display device and second display device)
18 operating device (working machine operating device)
19 telematics controller
31 CPU (display processing part)
M working machine master table (first storage part and third storage part)
T machine state information transaction table (second storage part)

The invention claimed is:

1. A server configured to be used for maintenance, the server being connected, via a network, to a plurality of working machines each including a working machine display device that, in a visual display format predetermined for each of the working machines, displays a maintenance screen used for maintenance and a working machine operating device to be used for predetermined operation, and to a monitoring terminal that includes a display part and remotely monitors information on the working machines, the server comprising:

a first storage part that previously stores display part data that is used for simulating the visual display format of the maintenance screen displayed in the working machine display device for each of the plurality of working machines, wherein the display part data includes information identifying a respective visual display format associated with each working machine of the plurality of working machines;

a second storage part that sequentially stores machine state data representing a machine state information acquired, together with a working machine ID for identifying a working machine and date and time information, from the working machines; and a display processing part that generates a maintenance simulated image having a same visual display format as the maintenance screen displayed in the working machine display device of the working machine specified by the monitoring terminal, the maintenance simulated image being a visual reproduction of the maintenance screen displayed in the working machine display device of the working machine specified by the monitoring terminal and having a same arrangement of graphics and display items, wherein the display processing part generates the maintenance simulated image based on the display part data of the working machine specified by the monitoring terminal and the machine state data of the working machine at a date and time specified by the monitoring terminal, the generated maintenance simulated image having the visual display format identified by the information of the display part data as being associated with the working machine specified by the monitoring terminal, and causes the display part of the monitoring terminal to display the maintenance simulated image.

2. The server according to claim 1, further comprising:
a third storage part that stores operating part data that is used for simulating an arrangement mode of switches and the like on the working machine operating device for each of the working machines,
wherein the display processing part generates an operating part simulated image that simulates the arrangement mode of the working machine operating device, based on the operating part data, and causes the display part to display the operating part simulated image together with the maintenance simulated image.

3. The server according to claim 2, wherein
the third storage part stores an operating device code for identifying a type of the working machine operating device, in association with the working machine ID.

4. The server according to claim 1, wherein
the first storage part stores a display mode code for identifying the display mode of the working machine display device, in association with the working machine ID, and
the second storage part stores the machine state information in association with the working machine ID.

5. The server according to claim 1, wherein
the machine state information includes overload preventing information for prevention of an overload state in the working machine, and vehicle travel information on travel of the working machine,
the working machine display device includes a first display device that displays the overload preventing information, and a second display device that displays the vehicle travel information, and
the display processing part causes the display part to simultaneously or selectively display a first display part simulated image that simulates a display mode of the first display device, and a second display part simulated image that simulates a display mode of the second display device.

6. The server according to claim 1, wherein
the display part data includes data relating to a display language or unit system used in the working machine display device, and
the display processing part generates a display part simulated image, which simulates a display mode of the working machine display device, based on the display part data of the working machine specified by a monitoring terminal and the machine state data of the working machine at a date and time specified by the monitoring terminal, and switches display of the machine state information in the display part simulated image, based on the data relating to the display language or the unit system.

7. A remote monitoring system connected, via a network, to a plurality of working machines each including a working machine display device that, in a visual display format predetermined for each of the working machines, displays a maintenance screen used for maintenance and a working machine operating device to be used for predetermined operation, the remote monitoring system comprising:

a first storage part that previously stores display part data that is used for simulating the visual display format of the maintenance screen displayed in the working machine display device for each of the plurality of working machines, wherein the display part data includes information identifying a respective visual display format associated with each working machine of the plurality of working machines;

a second storage part that sequentially stores machine state data representing a machine state information acquired, together with a working machine ID for identifying a working machine and date and time information, from the working machines;

a display processing part that generates a maintenance simulated image having a same visual display format as the maintenance screen displayed in the working machine display device of the working machine specified by the monitoring terminal, the maintenance simulated image being a visual reproduction of the maintenance screen displayed in the working machine display device of the working machine specified by the monitoring terminal and having a same arrangement of graphics and display items, wherein the display processing part generates the maintenance simulated image based on the display part data of the working machine specified by a monitoring terminal and the machine state data of the working machine at a date and time specified by the monitoring terminal, the generated maintenance simulated image having the visual display format identified by the information of the display part data as being associated with the working machine specified by the monitoring terminal; and a display part that displays the maintenance simulated image.

8. A remote monitoring method provided by a maintenance server connected, via a network, to a plurality of working machines each including a working machine display device that, in a visual display format predetermined for each of the working machines, displays a maintenance screen used for maintenance and a working machine operating device to be used for predetermined operation, and to a monitoring terminal that includes a display part and remotely monitors information on the working machines, the remote monitoring method comprising:

a step of previously storing, in a first storage part, display part data that simulate is used for simulating the visual display format of the maintenance screen displayed in the working machine display device for each of the plurality of working machines, wherein the display part data includes information identifying a respective visual display format associated with each working machine of the plurality of working machines;

a step of sequentially storing, in a second storage part, machine state data representing a machine state information acquired, together with a working machine ID for identifying a working machine and date and time information, from the working machines;

a step of generating a maintenance simulated image having a same visual display format as the maintenance screen displayed in the working machine display device of the working machine specified by the monitoring terminal, the maintenance simulated image being a visual reproduction of the maintenance screen displayed in the working machine display device of the working machine specified by the monitoring terminal and having a same arrangement of graphics and display items, wherein the maintenance simulated image is generated based on the display part data of the working machine specified by the monitoring terminal and the machine state data of the working machine at a date and time specified by the monitoring terminal, the generated maintenance simulated image having the visual display format identified by the information of the display part data as being associated with the working machine specified by the monitoring terminal; and a step of presenting, to the display part of the monitoring terminal, the maintenance simulated image.

9. The server according to claim 1, wherein the display processing part initially presents, to the monitoring terminal, a remote monitoring screen including a list that includes the working machine IDs and dates and times, and then combines the display part data of the working machine specified by the monitoring terminal with the machine state data of the working machine at the specified date and time, to present the combined data as the display part simulated image.

* * * * *